United States Patent
Ikegami

(10) Patent No.: US 11,259,174 B2
(45) Date of Patent: Feb. 22, 2022

(54) RADIO COMMUNICATION DEVICE AND METHOD OF CONTROLLING THE SAME

(71) Applicant: KYOCERA Corporation, Kyoto (JP)

(72) Inventor: Hiroshi Ikegami, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/878,095

(22) Filed: May 19, 2020

(65) Prior Publication Data
US 2020/0280838 A1 Sep. 3, 2020

Related U.S. Application Data

(63) Continuation of application No. PCT/JP2018/041372, filed on Nov. 7, 2018.

(30) Foreign Application Priority Data

Nov. 20, 2017 (JP) .............................. JP2017-222745

(51) Int. Cl.
| | |
|---|---|
| *H04W 8/18* | (2009.01) |
| *H04W 4/60* | (2018.01) |
| *H04L 67/303* | (2022.01) |
| *H04W 16/18* | (2009.01) |
| *H04W 68/00* | (2009.01) |

(52) U.S. Cl.
CPC ............ *H04W 8/183* (2013.01); *H04L 67/303* (2013.01); *H04W 4/60* (2018.02); *H04W 16/18* (2013.01); *H04W 68/00* (2013.01)

(58) Field of Classification Search
CPC ....... H04W 8/183; H04W 4/60; H04W 16/18; H04W 68/00; H04W 8/18; H04W 8/08; H04W 8/00; H04L 67/303; H04M 1/6075; H04M 1/675
See application file for complete search history.

(56) References Cited

U.S. PATENT DOCUMENTS

| | | | |
|---|---|---|---|
| 8,965,447 B1 * | 2/2015 | Wohld .................. | H04W 4/023 455/525 |
| 9,813,294 B2 | 11/2017 | Heintz et al. | |
| 2008/0039089 A1 * | 2/2008 | Berkman .............. | H04W 36/04 455/436 |

(Continued)

FOREIGN PATENT DOCUMENTS

| | | |
|---|---|---|
| CN | 103026754 A | 4/2013 |
| EP | 3 122 083 A1 | 1/2017 |

(Continued)

*Primary Examiner* — Afshawn M Towfighi
(74) *Attorney, Agent, or Firm* — Studebaker & Brackett PC

(57) ABSTRACT

A radio communication equipment of this application comprises a controller, and an information card configured to record a profile for using a service provided by a telecommunications company. The controller comprises a switching controller configured to switch the profile recorded on the information card, and an application controller configured to control a profile-compliant application using a service provided by the telecommunications company, in compliant with the profile. The switching controller is configured to read information from a new profile on the information card, when switching to the new profile. The switching controller is configured to notify the application controller of the information read from the new profile.

6 Claims, 4 Drawing Sheets

(56) References Cited

U.S. PATENT DOCUMENTS

| | | | |
|---|---|---|---|
| 2010/0311402 A1 | 12/2010 | Srinivasan et al. | |
| 2011/0306318 A1* | 12/2011 | Rodgers | H04L 67/16 |
| | | | 455/410 |
| 2016/0295544 A1* | 10/2016 | Jiang | H04W 8/205 |
| 2016/0330784 A1* | 11/2016 | Liu | H04W 4/00 |
| 2016/0353274 A1* | 12/2016 | Chichierchia | H04L 61/6054 |
| 2017/0222991 A1* | 8/2017 | Yang | H04L 63/20 |
| 2018/0220340 A1* | 8/2018 | Ramachandra | H04W 36/30 |
| 2020/0084614 A1* | 3/2020 | Xu | H04W 76/12 |

FOREIGN PATENT DOCUMENTS

| | | |
|---|---|---|
| GB | 2494710 A | 3/2013 |
| JP | 2014036340 A | 2/2014 |
| JP | 2014526820 A | 10/2014 |
| JP | 2017195455 A | 10/2017 |

\* cited by examiner

RADIO COMMUNICATION DEVICE AND METHOD OF CONTROLLING THE SAME

RELATED APPLICATIONS

The present application is a continuation based on PCT Application No. PCT/JP2018/041372, filed on Nov. 7, 2018, which claims the benefit of Japanese Patent Application No. 2017-222745 filed on Nov. 20, 2017. The content of which is incorporated by reference herein in their entirety.

TECHNICAL FIELD

The present disclosure relates to a radio communication equipment using an information card, such as a SIM card, and a method of controlling the same.

BACKGROUND ART

In some radio communication equipment compliant with 3rd generation partnership project (3GPP) standards, subscriber Identity Module cards (SIM cards) or user identity module (UIM) cards (hereinafter these are merely referred to as SIM cards) are provided by telecommunications companies (operators or telecommunications companies) and used by being mounted on the radio communication equipment.

The SIM cards are an IC card storing radio communication equipment subscriber (user) information, a service to which the user has subscribed, and the like. The user can use the service to which the user has subscribed, by using a radio communication equipment equipped with a SIM card.

Such a SIM card has been also used for a recent communication module mounted on a vehicle such as an automobile in order to provide a telematics service for providing traffic information, navigation information, and the like (i.e., see Patent Literature 1).

Furthermore, the SIM cards include a removable SIM card and an embedded subscriber identity module (eSIM). Although the removable SIM card is used for a general smartphone or the like, the eSIM is used for an in-vehicle or industrial radio communication equipment as well.

The eSIM is a subscriber authentication module storing a profile relating to a subscription to a service provided by a telecommunications company and is usually incorporated in a radio communication equipment. When the user changes the telecommunications company, a new profile is downloaded onto the radio communication equipment, and an old profile is rewritten with the new profile (i.e., see Patent Literature 2).

SUMMARY

A radio communication equipment of this application comprises a controller, and an information card configured to record a profile for using a service provided by a telecommunications company. The controller comprises a switching controller configured to switch the profile recorded on the information card, and an application controller configured to control a profile-compliant application using a service provided by the telecommunications company, in compliant with the profile. The switching controller is configured to read information from a new profile on the information card, when switching to the new profile. The switching controller is configured to notify the application controller of the information read from the new profile The application controller is configured to make the profile-compliant application using the service provided by the telecommunications company usable, based on the new profile.

DESCRIPTION OF EMBODIMENTS

The present disclosure provides a radio communication equipment and a method of controlling the same that are configured to appropriately operate a radio communication equipment even when a profile on a SIM card used for the radio communication equipment is rewritten.

Hereinafter, the present embodiment will be described with reference to the drawings.

Figure 1:
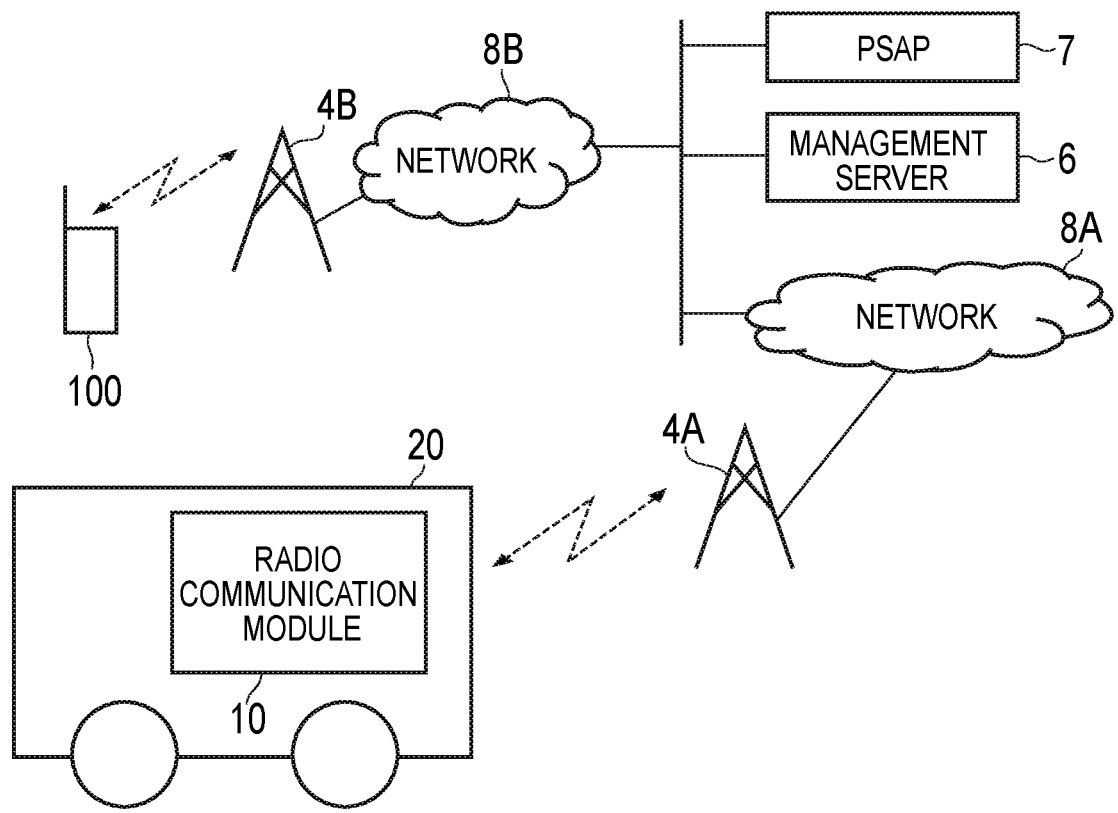
FIG. 1 is a configuration diagram of a radio communication system according to the present embodiment.

FIG. 1 is a configuration diagram of a radio communication system according to the present embodiment. The radio communication system illustrated in FIG. 1 includes a vehicle 20 mounted with a radio communication module 10, a base station 4A and a base station 4B, a network 8A and a network 8B, a radio terminal 100, a management server 6, and a PSAP 7.

The base station 4A and the network 8A are provided by a telecommunications company A. The base station 4B and the network 8B are provided by a telecommunications company B. Hereinafter, when the base stations 4 or the networks 8 are not distinguished, the base stations or the networks are simply described as a base station 4 or a network 8, and when the base stations 4 or the networks 8 are distinguished, the base stations or the networks are described as the base station 4A or 4B or the network 8A or 8B.

The base station 4 may support any mobile communication system, for example, a second-generation mobile communication system such as global system for mobile communications (registered trademark) (gsm), a third-generation mobile communication system such as code division multiple access (CDMA), or a fourth-generation mobile communication system such as long term evolution (LTE).

The radio communication module 10 achieves various functions. For example, the radio communication module 10 is configured to make a call to the PSAP 7 (including an emergency call center) in an emergency, in order to achieve an emergency call system. Furthermore, after a talking with an operator of the PSAP7 on the phone, the radio communication module 10 may receive an incoming call from the PSAP7. The radio communication module 10 may be configured to be able to make a call or receive a call on an IP phone on the basis of a voice over internet protocol (VoIP) or the like.

Furthermore, a telematics service is known to provide an information service in real time by combining the vehicle 20 and a communication system. In the telematics service, map data or point-of-interest (POI) data for updating data of the navigation system is downloaded from a server on a network 8. Furthermore, in the telematics service, diagnostic information about an in-vehicle equipment is uploaded onto a server on the network 8. The radio communication module 10 performs such download and upload via the network 8.

In the present embodiment, the radio communication module 10 is exemplified as an in vehicle system (IVS) mounted in a mobile body such as the vehicle 20. In the present embodiment, the vehicle 20 is described as an example of the mobile body. Of course, the mobile body may employ any mobile object, for example, a ship, train, or mobile terminal such as a mobile phone or smartphone.

The radio communication module 10 may support a second-generation mobile communication system, third-generation mobile communication system, or fourth-generation mobile communication system. The radio communication module 10 is also configured to communicate with the radio terminal 100. The radio communication module 10 may also have various functions and a function for executing a program created by the user.

The telecommunications company A that operates the base station 4 or the network 8 provides its own mobile communication service to users who have made an agreement with the telecommunications company A.

Figure 2:
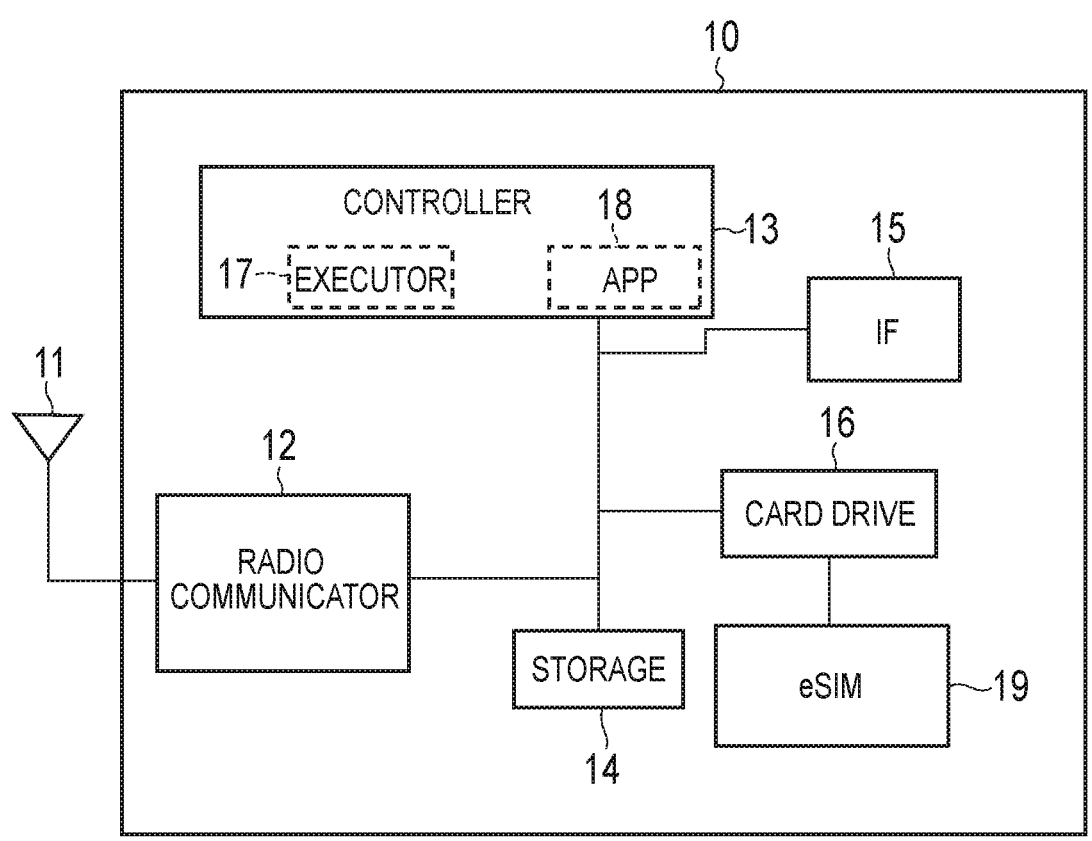
FIG. 2 is a block diagram of a radio communication module according to the present embodiment.

FIG. 2 is a block diagram of the radio communication module according to the present embodiment. The radio communication module illustrated in FIG. 2 includes an antenna 11, a radio communication unit 12, a controller 13, a storage 14, an IF 15, a card drive 16, an executor 17 (an example of a switching controller), an APP (application) 18 (an example of an application controller), and an eSIM 19 (an example of an information card).

The antenna 11 transmits and receives radio signals to and from a base station 4.

The radio communication unit 12 performs radio communication with a base station 4 via the antenna 11. The radio communication unit 12 includes an analog signal processing unit or a digital signal processing unit (neither illustrated). Radio connection includes, for example, LTE, W-CDMA, and GSM (registered trademark) in third generation partnership project (3GPP) standards and CDMA2000, WiMax, WiFi, and Bluetooth (registered trademark) in 3GPP2 standards.

The analog signal processing unit of the radio communication unit 12 performs amplification, analog-digital conversion processing, and the like of a radio signal received from the antenna 11, performs digital-analog conversion processing or the like of a digital signal transferred from the digital signal processing unit to amplify an analog signal, and transmits the analog signal via the antenna 11.

The digital signal processing unit of the radio communication unit 12 is configured to encode data transferred from the controller 13, convert the data into a digital signal so as to be transmitted through a radio signal communication channel, and decode the digital signal transferred from the analog signal processing unit, and transfers the decoded data to the controller 13.

The controller 13 mainly includes a microcomputer including a central processing unit (CPU) configured to execute various programs, a read only memory (ROM), a random access memory (RAM), a backup RAM, an input/output (I/O), and the like (neither illustrated) and executes various control programs stored in the ROM to execute various processing. The controller 13 executes a processing necessary for controlling the radio communication unit 12.

The storage 14 includes an electrically erasable and programmable read only memory (EEPROM) and the like and stores programs and information necessary for controlling the radio communication unit 12, in which the EEPROM is configured to electrically rewrites the contents.

The IF 15 includes an IF for USB, another IF, or the like and is connected to a display and a microphone and speaker or navigation system or the like.

The executor 17 executes processing for switching a profile stored in the eSIM 19. For example, the executor 17 may include an operating system (OS), software for switching profiles, or the like and may include the controller 13 for executing such software. By executing such software, the controller 13 functions as the switching controller. The OS is software implementing basic functions and the like of a computer, with which functions for basic management and control of electronic components mounted on the radio communication module 10 and a lot of software are commonly used, and that manages the entire system.

The APP 18 may include an application (program or software) or the like using a service provided by a telecommunications company or may include the controller 13 for executing the software. By executing such software, the controller 13 functions as the application controller. The application according to the present application mainly includes a profile-compliant application using a service provided by a telecommunications company, according to a profile or information stored in the profile. For example, the service provided by a telecommunications company includes a short message service (SMS), voice over long term evolution (VoLTE), or the like, and the profile-compliant application using the service includes an application using the SMS, VoLTE, or the like.

The eSIM 19 is an embedded SIM (eSIM). The eSIM 19 may be positioned outside the radio communication module 10. The information recorded in the eSIM 19 is rewritten via radio communication and the network 8. Such a method of rewriting via radio communication is called on the air (OTA).

The radio communication module 10 is in these days configured to be connected to a network of another telecommunications company by changing telecommunications company information (configuration information for connection to a telecommunications company network) stored in the profile recorded in the SIM.

The profile includes information about a subscriber to a telecommunications company, information about a service provided via a network, and information for using this service.

In the eSIM 19, configuration information necessary for receiving a service is recorded. For example, the configuration information includes various information such as information about a telecommunications company and information about a phone number (i.e., IVS phone number). For example, this information may be managed by the management server 6 on the network 8.

The card drive 16 is configured to read a profile recorded in the eSIM 19 and write a profile to the eSIM 19, in response to reception of reading and writing of the configuration information from the controller 13.

Note that the eSIM 19 may employ an IC card called a removable SIM card (or UIM card), that is, an information card, regardless of the type of the SIM card. A general SIM card records, for example, information for identifying a subscriber, telecommunications company identification information for identifying a telecommunications company, information about an available service to which the subscriber has subscribed. The same applies to the eSIM19.

Hereinafter, an operation of the radio communication system according to the present embodiment will be described.

Figure 3:
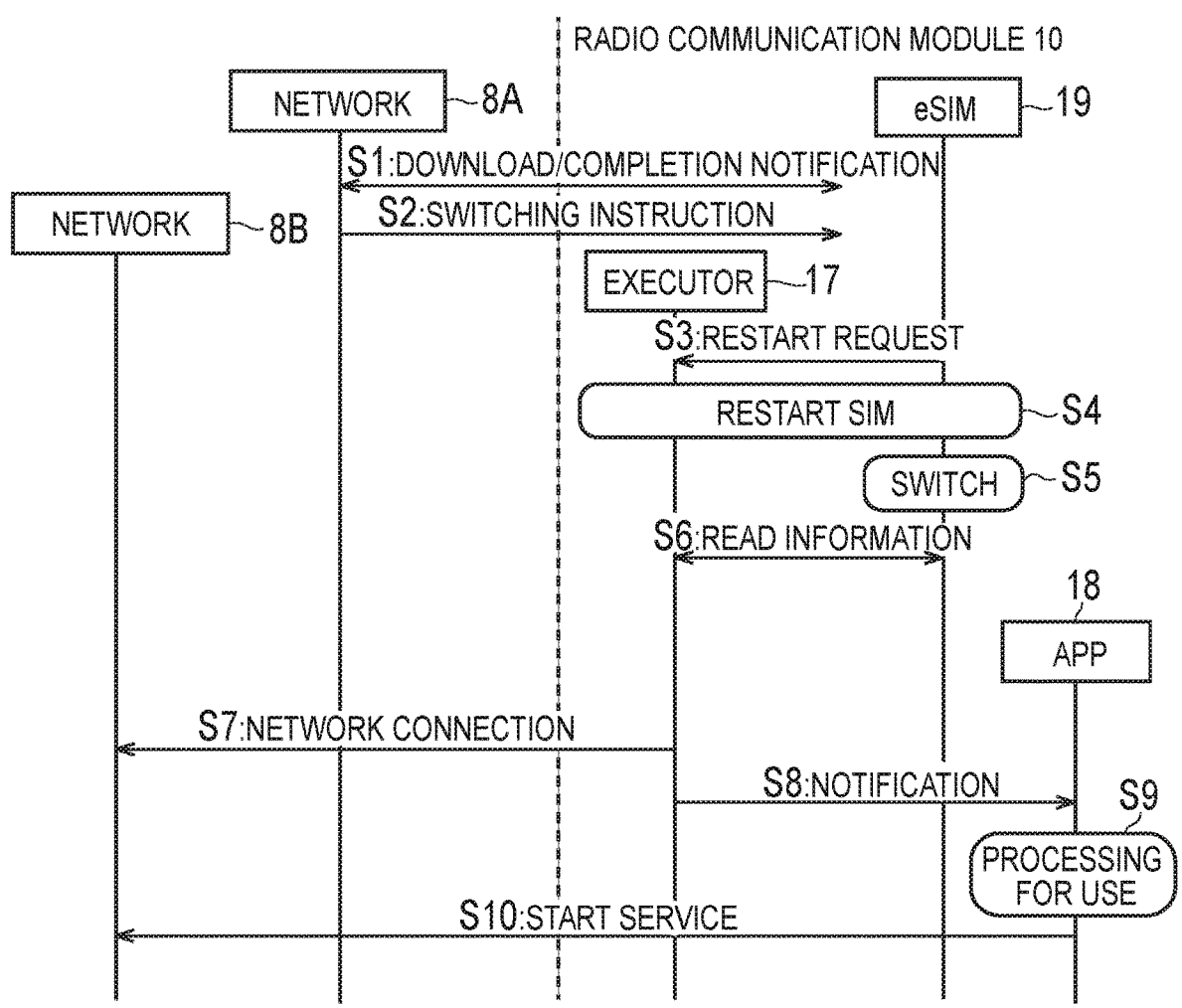
FIG. 3 is a sequence diagram illustrating an operation of the radio communication system according to the present embodiment.

FIG. 3 is a sequence diagram illustrating the operation of the radio communication system according to the present embodiment. The radio communication system according to the present embodiment is configured to be operable to rewrite a profile recorded in the eSIM 19 by OTA through a short message service (SMS) or the like. On the right side of a dashed line, components constituting the radio communication module 10 and the operation thereof are shown.

For example, the profile is rewritten, when an agreement with a current telecommunications company is changed to an agreement with another telecommunications company. Furthermore, even when the agreement is not changed to an agreement with another telecommunications company, the profile may be rewritten when the content of a service to which the user has subscribed is changed.

FIG. 3 illustrates a state in which the radio communication module 10 has subscribed to a service of the telecommunications company A and is connected to the network 8A, and in such a state, a profile recorded in the eSIM 19 is rewritten, when the radio communication module 10 newly subscribes to a service of the telecommunications company B. Note that, for example, in a case where the user uses the eSIM 19 of the radio communication module 10 for the first time, the eSIM 19 may be reset or a service may be temporarily recorded in the eSIM 19.

Firstly, an operator of the radio communication module 10, a program of the telecommunications company, or the like performs an operation of rewriting the content of the eSIM 19 of the radio communication module 10, thereby changing the subscription to the service of the telecommunications company A to the subscription to the service of the telecommunications company B. The processing at that time will be described below.

The eSIM 19 downloads a new profile from the network 8A (or a server connected to the network 8A) via the radio communication unit 12 or the like and, at the same time, transmits a completion notification to the network 8A (or the server connected to the network 8A) (step S1). The new profile has information about a service of the telecommunications company B. This information includes, for example, use of a communication system that cannot be used by the telecommunications company A and can be used by the telecommunications company B (wireless LAN, dial-up, and the like in addition to cellular communications systems such as a second-generation mobile communication system, third-generation mobile communication system, and fourth-generation mobile communication system).

In response to reception of a switching instruction from the network 8A (or the server connected to the network 8A) (step S2), the eSIM 19 requests the executor 17 to restart the eSIM 19 (step S3).

In response to reception of the restart request, the executor 17 restarts the SIM (here, restarts the eSIM 19) (step S4). Here, when the restart (refresh) is performed, the eSIM 19 switches an old profile to a new profile (step S5).

After the restart of the SIM, the executor 17 reads the information stored in the new profile from the eSIM 19 (step S6). Here, since the new profile is information relating to the service of the telecommunications company B, the executor 17 reads a communication system used by the telecommunications company B and connects to the network 8B by using the communication system (step S7).

Note that in order to extract information about the telecommunications company B, for example, the executor 17 preferably acquires an international mobile subscriber identity (IMSI) from the profile. The IMSI includes public land mobile network identifier (PLMNID) and mobile subscriber identification number (MSIN). Normally, the PLMNID represents an ID of a telecommunications company, and in the case of the example of FIG. 3, the PLMNID is the ID of the telecommunications company B.

Furthermore, the executor 17 notifies the APP 18 of the information stored in the new profile (step S8). To support the changed service of the telecommunications company B on the basis of the information stored in the new profile, the APP 18 performs processing to make an application used via the network of the telecommunications company B usable (step S9). Then, this application starts the service of the telecommunications company B (step S10).

Step S7 and step S8 may be performed at the same time. Depending on the situation, step S8 might be performed earlier than step S7.

As a method of making the application usable, an application used via the network of the telecommunications company B or via the communication system used by the telecommunications company B is installed in advance in the radio communication module 10 so that the application may be executed. In addition, the APP 18 may download and install an application used via the network of the telecommunications company B or via the communication method used by the telecommunications company B, on the basis of the information stored in the new profile so that the application may be executed.

Furthermore, the APP 18 may be configured to uninstall an application used in the previous profile and used via the network of the telecommunications company A.

As described above, in the radio communication system according to the present embodiment, when a profile of the eSIM 19 is rewritten, the executor 17 notifies the APP 18 (application controller) of information stored in a new profile. Thus, an application used via a network of a telecommunications company stored in the new profile is made usable with no user's manual operation, and the operation of the radio communication equipment can be appropriately performed.

When the profiles are switched, in the radio communication module 10, if the executor 17 does not notify the APP 18 (application controller) of the information stored in the new profile to, an application used via the network of the telecommunications company stored in the old profile is operated. This means that the user cannot immediately use a service provided by the telecommunications company indicated by the new profile. It is troublesome for the user to install and configure the application used via the network of the telecommunications company indicated by the new profile, again later, through the user's manual operation.

Figure 4:
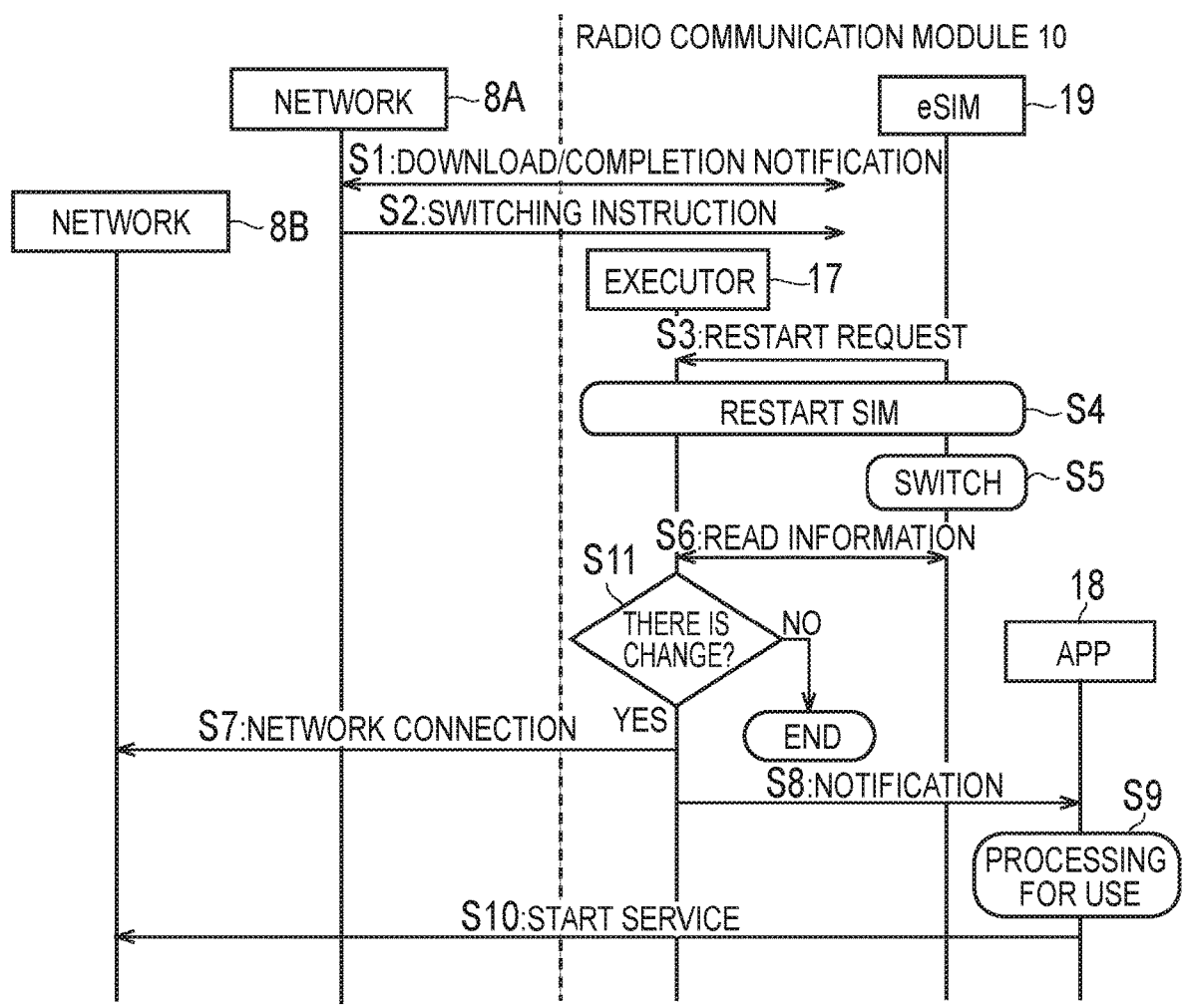
FIG. 4 is a sequence diagram illustrating an operation (part 2) of the radio communication system according to the present embodiment.

FIG. 4 is a sequence diagram (part 2) illustrating an operation of the radio communication system according to the present embodiment. On the right side of a dashed line, components constituting the radio communication module 10 and the operation thereof are shown. The same reference numerals as the operations of the radio communication system according to the present embodiment as described in FIG. 3 are denoted by the same reference numerals, and the descriptions thereof will be omitted.

The descriptions of steps S1 to S5 are omitted, and in step S6, the executor 17 reads information stored in a new profile from the eSIM 19, compares information stored in an old profile with the information stored in the new profile, and determines whether there is a change in the contents between the profiles (step S11).

Note that information stored in a profile is stored in the storage 14 or the like, for example, every time profiles are switched or in an initial state. Information stored in an old profile has been stored in the storage 14 or the like, and the information stored in the old profile and the information stored in the new profile are compared with each other.

For example, if information about a telecommunications company (e.g., identification information about the telecommunications company such as IMSI) is changed (YES in step S11) or if there is no information about the telecommunications company, operations after step S7 are performed (the APP 18 is notified of the information stored in the new profile), and otherwise (NO in step S11), the operation ends as illustrated in FIG. 4 (the APP 18 is not notified of the information stored in the new profile). Note that if there is no change in information between the profiles (NO in step S11), the operation ends as illustrated in FIG. 4.

When a service is partially changed with no change in the information about the telecommunications company, the operations after step S7 may be performed. In that case, for example, in step S9, an application corresponding to the service is downloaded and installed.

As described above, the radio communication system according to the present embodiment, when all or part of information stored in a profile in the eSIM 19 is not rewritten, skips subsequent operations and does not perform unnecessary operations. Thus, the operation of switching profiles is performed efficiently.

Although the radio communication system according to the present embodiment, which is configured to be connected to the network 8A, has been described, a profile recorded in the eSIM 19 can be rewritten even when connected to another network (e.g., wireless LAN).

INDUSTRIAL APPLICABILITY

According to the present disclosure, even when a profile on a SIM card used for a radio communication equipment is rewritten, the operation of the radio communication equipment can be appropriately performed.

The invention claimed is:

1. A radio communication equipment comprising:
an information card configured to record a first profile for using a service provided by a first telecommunications company;
an application controller configured to control a first application using the service provided by the first telecommunications company, in compliance with the first profile; and
a switching controller configured to switch the first profile recorded in the information card to a second profile for using a service provided by a second telecommunications company, wherein
the switching controller is configured to read information from the second profile, when switching the first profile to the second profile,
the switching controller is configured to notify the application controller of the information read from the second profile, and
the application controller is configured to make a second application using the service provided by the second telecommunications company, in compliance with the second profile, usable, based on the information notified by the switching controller and control the second application, and
the application controller is configured to download and install the second application based on the information read from the second profile, when making the second application usable.

2. The radio communication equipment according to claim 1, wherein the switching controller is configured to notify the application controller of the information read from the second profile, when content of the second profile is different from content of the first profile.

3. The radio communication equipment according to claim 1, wherein the switching controller is configured to notify the application controller of the information read from the second profile, when identification information of the second telecommunications company is different from identification information of the first telecommunications company.

4. The radio communication equipment according to claim 1, wherein the switching controller is configured to notify the application controller of the information read from the second profile, when identification information of the second telecommunications company matches identification information of the first telecommunications company the service provided by the second telecommunications company is different from the service provided by the first telecommunications company.

5. A method of controlling a radio communication equipment, the radio communication equipment comprising:
an information card configured to record a first profile for using a service provided by a first telecommunications company;
an application controller configured to control a first application using the service provided by the first telecommunications company, in compliance with the first profile; and
a switching controller configured to switch the first profile recorded in the information card to a second profile for using a service provided by a second telecommunications company, wherein the method comprises:
reading, by the switching controller, information from the second profile, when switching the first profile to the second profile;
notifying, by the switching controller, the application controller of the information read from the second profile;
making a second application using the service provided by the second telecommunications company, in compliance with the second profile, usable, based on the information notified by the switching controller and controlling the second application; and
downloading and installing, the second application based on the information read from the second profile, when making the second application usable.

6. A vehicle comprising the radio communication equipment according to claim 1.

* * * * *